Nov. 28, 1950     E. J. MOCK     2,531,859
TRAILER HITCH
Filed Dec. 1, 1947
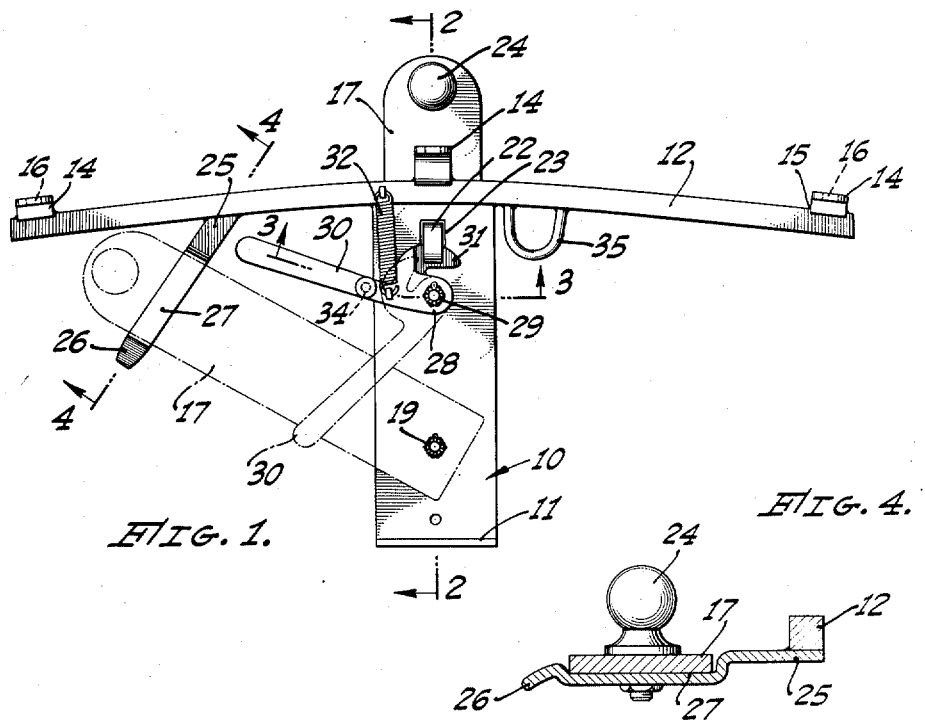
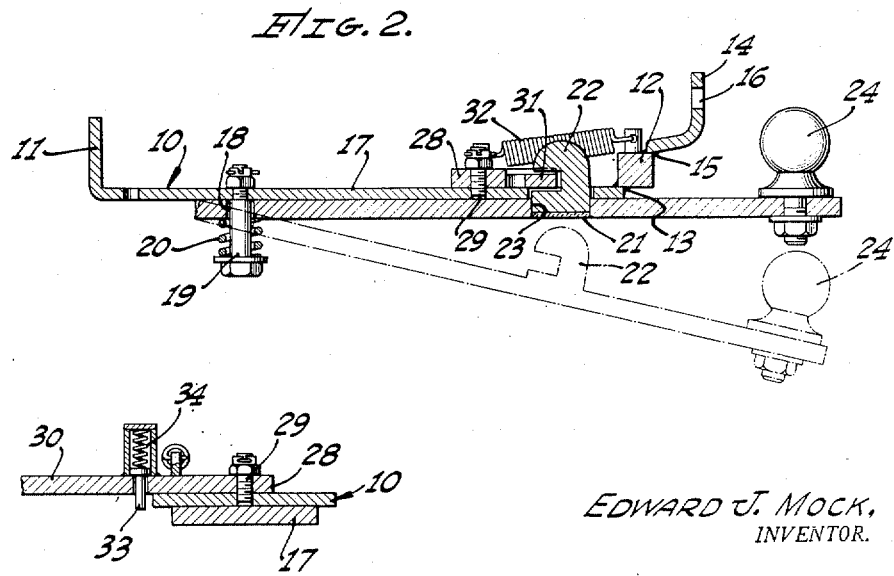
EDWARD J. MOCK,
INVENTOR.
BY Hazard & Miller
ATTORNEYS.

Patented Nov. 28, 1950

2,531,859

UNITED STATES PATENT OFFICE 2,531,859

TRAILER HITCH

Edward J. Mock, Harrisburg, Oreg.

Application December 1, 1947, Serial No. 789,081

4 Claims. (Cl. 280—33.44)

This invention relates to improvements in trailer hitches used for detachably connecting the drawbars of trailers to automobiles and similar towing vehicles.

A primary object of this invention is to provide a trailer hitch consisting of a frame that may be applied to an automobile to occupy a position forwardly of the rear bumper thereof and which carries a movable bar on which a ball or other attaching device is mounted. This bar is movably mounted on the frame in such a manner that it may assume either of two positions. In one of these positions the bar extends rearwardly of the bumper so as to properly position the ball thereon rearwardly of the bumper to enable the drawbar of the trailer to be conveniently attached thereto. In the other position the bar and the ball thereon are disposed entirely forwardly of the rear bumper.

In the conventional trailer hitch the bar on which the ball or similar attachment is mounted is stationarily mounted on the automobile and projects rearwardly of the rear bumper so that the ball is so positioned as to enable the trailer drawbar to be conveniently attached thereto. However, when the trailer is detached from the automobile the rearwardly projecting portion of the bar and the ball not only are unsightly but create an objectionable hazard in that the projecting bar and ball may damage the radiator grill or an automobile contacting the automobile on which the hitch is mounted even though their bumpers may mutually engage.

By having the bar and its ball capable of assuming a position forwardly of the rear bumper when not in use this objectionable unsightliness is avoided and the above mentioned hazard is eliminated.

Another object of the invention is to provide a trailer hitch having the above mentioned characteristics and wherein a novel, simple and advantageous means is provided for locking the bar in its retracted position in such a manner that it will not rattle.

With the foregoing and other objects in view, which will be made manifest in the following detailed description and specifically pointed out in the appended claims, reference is had to the accompanying drawings for an illustrative embodiment of the invention, wherein:

Fig. 1 is a top plan view of the trailer hitch embodying the present invention illustrating in dotted lines the position assumed by the bar when in its retracted position;

Fig. 2 is a vertical section taken substantially upon the line 2—2 upon Fig. 1;

Fig. 3 is a partial view in vertical section taken substantially upon the line 3—3 upon Fig. 1; and Fig. 4 is a sectional view taken upon the line 4—4 upon Fig. 1 and illustrating the bar in its retracted position.

Referring to the accompanying drawings wherein similar reference characters designate similar parts throughout, the improved trailer hitch comprises a rigid frame of generally T-shaped configuration made up of a forwardly extending plate 10 which preferably has its forward end 11 bent upwardly for attachment to the transverse member at the back of the automobile frame. Any suitable means for attaching this portion to the frame may be employed and holes may be drilled therein and into the frame to receive bolts, rivets or similar fastening devices. A transverse member 12 that is preferably curved or arched to conform to the curvature of a rear bumper is secured to the rear end of the plate 10 such as by welds 13. This transverse member has upwardly extending ears 14 secured thereto at spaced intervals such as by welds 15 and the holes 16 through the ears are adapted to have the bolts on the bumper which extend through the bumper support positioned therein. In other words, in applying the frame to an automobile the rear bumper bar is detached from the bumper supports and the ears 14 are positioned so that their holes 16 are in alignment with the holes in the bumper supports. The bumper bar is then reapplied so that the studs or bolts on the bumper bar are extended through the holes 16 and into the holes of the bumper support. In this manner the transverse member 12 is positioned forwardly of the rear bumper bar and at a position approximately flush with its lower edge.

A bar 17 is positioned against the bottom of the plate 10 and has an aperture 18 formed in its forward end through which a shouldered bolt 19 loosely extends. There is a substantial clearance between the hole 18 and the bolt 19 so that the bar 17 may either swing about the bolt 19 as a pivot or tilt relatively thereto in swinging downwardly from the full-line position shown in Fig. 2 to the dotted-line position shown therein. A coil compression spring 20 is disposed about the bolt 19 and normally urges the bar 17 upwardly against the bottom of the plate 10. Intermediate the ends of the bar 17 there is rigidly secured thereto such as by welding 21 a forwardly open latch hook 22 that is receivable upwardly through a slot 23 formed in the rear end of the plate 10. The rear end of the bar 17 may have the conventional ball 24 mounted thereon to which is applicable the socket on the conventional trailer drawbar. This ball is so positioned on the bar 17 as to assume a position rearwardly of the rear bumper when the bar 17 is in the full-line position shown in Fig. 1. However, on forcing the bar 17 downwardly into the dotted-line position shown in Fig. 2 against the action of the compression spring 20 the ball 24 may assume a position well below the bottom edge of the rear bumper and while in this depressed position the bar 17 may be swung from the full-line position shown in Fig. 1 into the dotted-line position shown therein thus passing the ball 24 beneath the bottom edge of the bumper and shifting it into a position forwardly of the rear bumper. A bar holder 25 extends forwardly from the transverse member 12 and presents an inclined or cammed forward end indicated at 26. This holder is depressed as indicated at 27 intermediate its ends to receive the bar 17 so that after the bar has been swung forwardly of the dotted position shown in Fig. 1 it may then be released allowing the spring 20 to return the bar to its normal horizontal position and forced rearwardly over the top of the holder 25. When the bar 17 becomes seated in the depression 27, it will be normally retained in this position until forcibly displaced therefrom. The elevation of the holder 25 is such with relation to the plate 10 that the spring 20 is effective to press the bar 17 firmly against the bottom of the depression 27 and to prevent rattling when the bar is in its retracted position.

A latch 28 is pivotally mounted on the plate 10 such as by a bolt 29. This latch is equipped with a handle 30 and has a finger 31 that normally occupies a position extending through the crotch of the latch hook 22, as illustrated in Fig. 1. A tension spring 32 connects the latch with the transverse member 12 and normally urges the latch into that position wherein the finger 31 is in locking position within the latch hook. However, it is possible to forcibly swing the latch by means of its handle 30 against the tension of the tension spring 32 into the dotted line position, shown in Fig. 1, to unlock the bar 17 to permit its being swung into retracted position as previously described.

As a means for preventing the latch from being accidentally shifted into unlocking position the handle 30 carries a spring actuated pin 33 that is urged downwardly by means of a compression spring 34. This pin normally projects below the bottom of the handle 30 so as to be engageable with the side edge of the plate 10 limiting rearward swinging movement of the latch to the full-line position shown in Fig. 1 and also limiting forward swinging movement of the latch to a position wherein the finger 31 is still in locking engagement with the latch hook 22. Whenever it is desired to release the latch hook 22 it is necessary to manually elevate the pin 33 against the action of its compression spring 34 to a position wherein the bottom of the pin is above the top surface of the plate 10. When this is done the latch may be swung into the dotted-line position shown in Fig. 1 to completely release the latch hook 22. However, unless the pin is thus elevated the latch will remain in locking engagement with the latch hook. In this manner accidental unlocking of the bar 17 is effectively prevented.

In many jurisdictions a safety chain must also connect the trailer hitch with the trailer in addition to the trailer drawbar and to this end a staple 35 may be welded or otherwise secured to the transverse member 12 providing for attachment of the safety chain thereto.

From the above described construction it will be appreciated that an improved, simple and highly durable trailer hitch is provided which enables the bar thereof on which the ball is mounted to assume either of two positions. In the towing position the ball is positioned rearwardly of the rear bumper bar and at a suitable elevation for the attachment of the drawbar thereto. In this position the bar 17 is effectively locked by the latch and can not be inadvertently or accidentally unlocked because of the presence of the spring actuated pin 33 on the latch which is engageable with the side edge of plate 10. However, when the latch is intentionally swung into the dotted-line position shown in Fig. 1 the latch hook 22 is released enabling the bar 17 to be swung downwardly a sufficient distance so that the ball 24 will clear the bottom edge of the rear bumper bar. The bar 17 can then be swung toward its retracted position and lifted over the holder 25 which retains it in a position entirely forward of the rear bumper bar. In this position the bar 17 is effectively held against rattling and in its normal position it is similarly held not only by reason of the spring 20 but also by virtue of the fact that the finger 31 is preferably tapered toward its outer end so that when the latch is in its locking position the tapered finger tends to tighten the bar 17 against the under side of the plate 10.

Various changes may be made in the details of construction without departing from the spirit and scope of the invention as defined by the appended claims.

I claim:

1. A trailer hitch comprising a frame applicable to a vehicle forwardly of the rear bumper thereof, a bar having a connection for the attachment of a trailer drawbar thereto, a pivot bolt extending through the bar mounted on the frame, said pivot bolt having adequate clearance enabling the bar to be swung downwardly beneath the frame to clear the connection beneath the bottom of the bumper and to be swung forwardly of the rear bumper while thus cleared, a compression spring about the bolt urging the bar upwardly with relation to the frame, and means for releasably holding the bar in either a position wherein the connection is disposed rearwardly of the rear bumper or forwardly thereof.

2. A trailer hitch comprising a frame applicable to a vehicle forwardly of the rear bumper thereof, a bar having a connection for the attachment of a trailer drawbar thereto, means connecting the bar and the frame enabling the bar to be swung downwardly so that the connection will clear the bottom of the rear bumper bar and enabling the bar to swing forwardly while the connection is thus cleared, a latch hook on the bar receivable through a slot in the frame, a latch on the frame engageable with the latch hook to lock the bar in a position wherein the connection is disposed rearwardly of the rear bumper bar, and a holder on the frame adapted to receive and hold the bar when the bar is in its forward position.

3. A trailer hitch comprising a frame applicable to a vehicle forwardly of the rear bumper thereof, a bar having a connection for the attachment of a trailer drawbar thereto, means mounting the bar upon the frame for movement downwardly with relation thereto so as to clear the connection below the bottom of the rear bumper bar and enabling it to swing forwardly thereof, a latch hook on the bar receivable through a slot on the frame, a latch pivotally mounted on the frame engageable with the latch hook, spring means normally urging the latch into engagement with the latch hook, and means on the latch for preventing the latch from being inadvertently swung into latch hook releasing position.

4. A trailer hitch comprising a frame applicable to a vehicle forwardly of the rear bumper thereof, a bar having a connection for the attachment of a trailer drawbar thereto, means mounting the bar upon the frame for movement downwardly with relation thereto so as to clear the connection below the bottom of the rear bumper bar and enabling it to swing forwardly thereof, a latch hook on the bar receivable through a slot on the frame, a latch pivotally mounted on the frame engageable with the latch hook, spring means normally urging the latch into engagement with the latch hook, and means on the latch for preventing the latch from being inadvertently swung into latch hook releasing position, said means comprising a spring actuated pin mounted on the latch engageable with the frame restricting movement of the latch until the pin is manually displaced again from its normal position.

EDWARD J. MOCK.

REFERENCES CITED

The following references are of record in the file of this patent:

UNITED STATES PATENTS

| Number | Name | Date |
|---|---|---|
| 2,309,850 | Klawitter | Feb. 2, 1943 |
| 2,408,531 | Riemann et al. | Oct. 1, 1946 |